United States Patent
Popa et al.

(10) Patent No.: US 11,608,055 B2
(45) Date of Patent: Mar. 21, 2023

(54) ENHANCED AUTONOMOUS SYSTEMS WITH SOUND SENSOR ARRAYS

(71) Applicant: NXP USA, Inc., Austin, TX (US)

(72) Inventors: Daniel Dumitru Popa, Bucharest (RO); Constantin Razvan Chivu, Bucharest (RO); Marius Lucian Andrei, Comana (RO)

(73) Assignee: NXP USA, Inc., Austin, TX (US)

( * ) Notice: Subject to any disclaimer, the term of this patent is extended or adjusted under 35 U.S.C. 154(b) by 252 days.

(21) Appl. No.: 16/985,264

(22) Filed: Aug. 5, 2020

(65) Prior Publication Data

US 2021/0385573 A1 Dec. 9, 2021

(30) Foreign Application Priority Data

Jun. 4, 2020 (RO) .............................. a 2020 00318

(51) Int. Cl.
*B60W 30/08* (2012.01)
*G05D 1/02* (2020.01)
*G01S 15/931* (2020.01)

(52) U.S. Cl.
CPC .......... *B60W 30/08* (2013.01); *G05D 1/0255* (2013.01); *B60W 2420/42* (2013.01); *B60W 2420/52* (2013.01); *B60W 2420/54* (2013.01); *G01S 15/931* (2013.01); *G05D 1/0248* (2013.01); *G05D 1/0257* (2013.01); *G05D 2201/0213* (2013.01); *H04R 2499/13* (2013.01)

(58) Field of Classification Search
CPC combination set(s) only.
See application file for complete search history.

(56) References Cited

U.S. PATENT DOCUMENTS

| | | | |
|---|---|---|---|
| 6,782,104 | B1 | 8/2004 | Vielledent |
| 9,955,277 | B1* | 4/2018 | Alexandridis ............ H04S 7/30 |
| 10,042,038 | B1* | 8/2018 | Lord ....................... G10L 25/51 |
| 10,447,970 | B1* | 10/2019 | Chu ........................ H04N 7/147 |
| 2003/0201906 | A1 | 10/2003 | Buscemi |
| 2010/0019880 | A1 | 1/2010 | Huang et al. |
| 2018/0077507 | A1* | 3/2018 | Bernal Castillo .... H04R 29/005 |
| 2018/0335503 | A1* | 11/2018 | Seifert ...................... B60R 1/00 |

(Continued)

OTHER PUBLICATIONS

Kodera et al., "Approaching Vehicle Detection Using Linear Microphone Array," International Symposium on Information Theory and its Applications, ISITA2008, Auckland, New Zealand, 7-10, Dec. 2008, 6 pages.

(Continued)

*Primary Examiner* — Anne Marie Antonucci
*Assistant Examiner* — Amelia Vorce

(57) ABSTRACT

A method, system, apparatus, and architecture are provided for generating a sound-enhanced sensing envelope. A plurality of sensors and one or more passive sound sensors of a vehicle are used to collect and process sensor data signals characterizing an exterior environment of the vehicle, thereby generating a sensing envelope around the vehicle using direct sensing data signals and a sound-enhanced sensing envelope around the vehicle using indirect sensing data signals. The sound-enhanced sensing envelope is used to evaluate advanced driver assistance system commands for the vehicle with respect to safety-related events identified by the indirect sensing data signals.

20 Claims, 3 Drawing Sheets

(56) References Cited

U.S. PATENT DOCUMENTS

| | | | |
|---|---|---|---|
| 2019/0018131 A1 | 1/2019 | Luders et al. | |
| 2019/0049958 A1 | 2/2019 | Liu et al. | |
| 2020/0005810 A1* | 1/2020 | Park | H04R 1/406 |
| 2020/0019160 A1* | 1/2020 | McArthur | G01S 17/87 |
| 2020/0202626 A1* | 6/2020 | Moody | G06T 19/006 |
| 2020/0209882 A1* | 7/2020 | Kashi | G10K 11/178 |
| 2020/0211213 A1* | 7/2020 | Das | G01S 5/18 |
| 2020/0241552 A1* | 7/2020 | Leenayongwut | G10L 25/51 |
| 2021/0136487 A1* | 5/2021 | Shumard | H04R 1/326 |
| 2021/0345043 A1* | 11/2021 | Trestain | H04R 3/02 |

OTHER PUBLICATIONS

Kongrattanaprasert et al., "Application of Neural Network Analysis to Automatic Detection of Road Surface Conditions Utilizing Tire Noise from Vehicles," ICROS-SICE International Joint Conference Aug. 18-21, 2009, 2009, Fukuoka International Congress Center, Japan, 5 pages.

George et al., "Vehicle Detection and Classification From Acoustic Signal Using ANN and KNN," 2013 International Conference on Control Communication and Computing (ICCC), 4 pages.

Palecek et al., "Emergency Horn Detection Using Embedded Systems," SAMI 2016, IEEE 14th International Symposium on Applied Machine Intelligence and Informatics, Jan. 21-23, 2016, Herl'any, Slovakia, 5 pages.

Luitel et al., "Sound Event Detection in Urban Soundscape using Two-level Classification," IEEE International Conference on Distributed Computing, VLSI, Electrical Circuits and Robotics (DISCOVER), at National Institute of Technology Karnataka, Surathkal, Mangalore, India, Aug. 2016, 5 pages.

Li et al., "A Comparison of Deep Learning Methods for Environmental Sound Detection," 2017 IEEE International Conference on Acoustics, Speech and Signal Processing (ICASSP), ICASSP Mar. 2017, 5 pages.

Hayashi et al., "BLSTM-HMM Hybrid System Combined with Sound Activity Detection Network for Polyphonic Sound Event Detection," 2017 IEEE International Conference on Acoustics, Speech and Signal Processing (ICASSP), Mar. 2017, 5 pages.

Dabran et al., "An Intelligent Sound Alarm Recognition System for Smart Cars and Smart Homes," NOMS 2018, IEEE/IFIP Network Operations and Management Symposium (NOMS), Apr. 2018, 4 pages.

Arslan et al., "Performance of Deep Neural Networks in Audio Surveillance," 2018 6th International Conference on Control Engineering & Information Technology (CEIT), Oct. 25-27, 2018, Istanbul, Turkey, 5 pages.

Michigan Tech Research Institute, "Automotive Benchmarking Sensors, Benchmarking Sensors for Vehicle Computer Vision Systems," retrieved from the internet May 1, 2020, https://mtri.org/automotivebenchmark.html, 2 pages.

Wong, Thomas, "Autonomous Driving and Sensor Fusion SoCs—Global Semiconductor Alliance," retrieved from the internet May 1, 2020, https://www.gsaglobal.org/forums/autonomous-driving-and-sensor-fusion-socs/, 5 pages.

Taranovich, Steve, EDN—Future functionality and safety of the automobile with more MEMS and sensors, retrieved from the internet May 1, 2020, 5 pages.

Tadjine et al., "Acoustic/Lidar Sensor Fusion for Car Tracking in City Traffic Scenarios," Sep. 8, 2015, 29 pages.

Saxena, Anshul, "Visteon, Current sensor data fusion architectures: Visteon's approach," retrieved from the internet May 1, 2020, https://www.visteon.com/current-sensor-data-fusion-architectures-visteons-approach/, 2 pages.

\* cited by examiner

ENHANCED AUTONOMOUS SYSTEMS WITH SOUND SENSOR ARRAYS

BACKGROUND OF THE INVENTION

Field of the Invention

The present invention is directed in general to automotive safety systems. In one aspect, the present invention relates to advanced driver-assistance systems (ADAS) and methods of operating same to assist with vehicle operation.

Description of the Related Art

One of the fastest growing segments in the automotive electronics industry is in the area of Advanced Driver Assistance Systems (ADAS) technologies which reflect a rising interest in road and traffic safety, both at the level of the government and the individual. In operation, vehicles with ADAS systems can detect and classify objects, alert the driver of hazardous road conditions and/or control the vehicle (e.g., automatically decelerate or stop the vehicle) based on the sensed vehicle situation. Existing driving automation systems rely heavily on a variety of sensors to model and respond to the driving environment, primarily relying on a mix of camera, radar, ultrasonic, and lidar sensor technologies which are combined with a sensor fusion approach to arrive at situational awareness and/or driving conditions. This reliance on sensor data will only increase with fully automated ADAS vehicles where multiple orthogonal and complementary sensors are used together to provide information and redundancy to enhance safety and improve the driver's performance. However, there are significant costs and limitations associated with the use of standard camera, ultrasound, lidar, and radar sensors. For example, there are hardware costs for the sensors, such as lidar sensors which are very expensive. There are also complexities created by using active sensors, such as radar, lidar, or ultrasound sensors which require sending a signal and measuring the response. In addition, there are sensing limitations with some sensors, such as radar sensors which have limited angular and range resolution compared to cameras, or image/lidar sensors which can be impaired by bad weather conditions. There are also computational costs associated with processing certain types of sensor data, such as radar or image data which requires significant digital signal processing. As seen from the foregoing, the existing sensor-based vehicle driving systems are extremely difficult at a practical level by virtue of the challenges with providing a sensor-based advanced driver assistance system which meets the applicable performance, design, complexity and cost constraints.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An autonomous vehicle driving apparatus, system, method, and program code are described for using sound sensors in combination with multiple orthogonal and complementary sensors to enhance the detection, classification, and notification of hazardous road conditions by passively capturing sound signal from the driving environment to augment a sensing envelope around the vehicle which is used to identify safety-related events. In selected embodiments, the sound-enhanced autonomous vehicle driving system uses a sound sensor array as an additional class of long-range sensors to improve the vehicle sensing capabilities by creating a multi-dimensional sensing map around a vehicle which augments the vehicle's sensing envelope. In particular, the sound-enhanced autonomous vehicle driving system may use the sound sensor array in combination with multiple orthogonal and complementary sensors to provide additional information that improves the driver's performance during defensive maneuvers (e.g., emergency braking, traffic merging, changing traffic lanes, etc.), free-space checking (e.g., free-path planning), or the like. In addition or in the alternative, the sound-enhanced autonomous vehicle driving system may generate additional information that provides redundancy to enhance driver safety with an efficient safety channel computation that is used to check a driving channel computation as required by various Automotive Safety Integrity Levels (ASIL) for electronic control units (ECUs). Processed in real time with inexpensive processing techniques, the sound sensor data results can be used to build a safety net around the device to augment the decisions generated from the primary sensor data during emergency actions (e.g., using the sound sensor data to identify an immediate threat during a vehicle operation) and/or check actions (e.g., using the sound sensor data to notify the autonomous driving system of an unidentified threat). In addition or in the alternative, the sound sensor data results can be used as a "digital twin" or "arbiter" when verifying or confirming autonomous driving maneuvers generated in response to the primary sensor data analysis and/or to enhance the safety of the autonomous driving system by feeding in new type of data which cannot be captured with the primary sensors.

Figure 1:
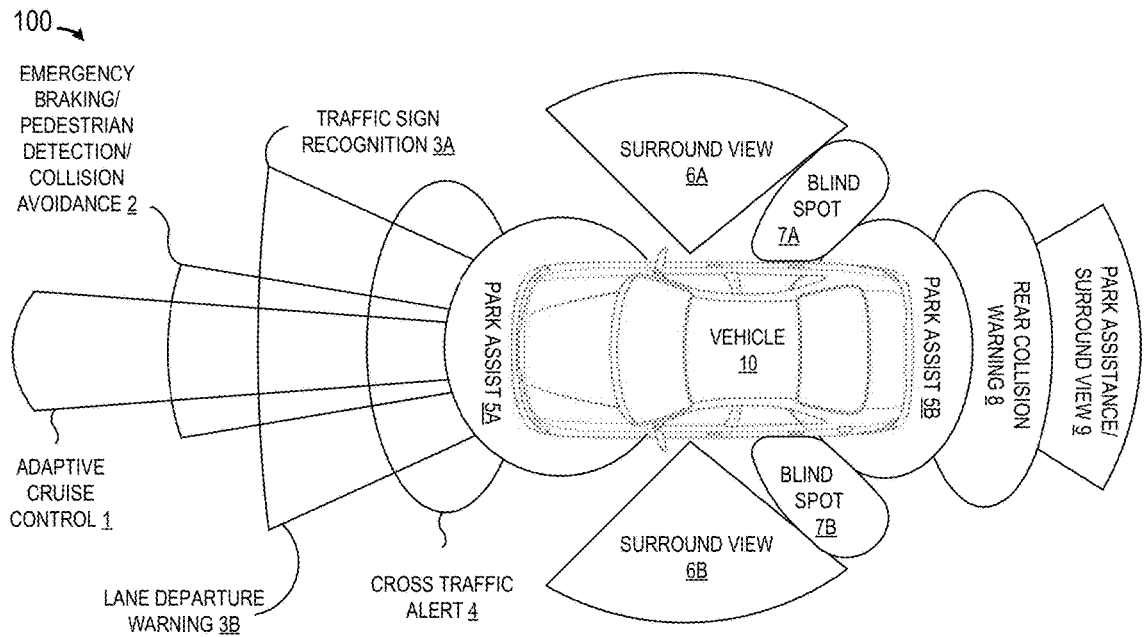
FIG. 1 depicts a simplified plan view of a vehicle which includes various sensors, vision systems, controllers, and communications systems.

To provide additional details for an improved contextual understanding of selected embodiments of the present disclosure, reference is now made to FIG. 1 which depicts a simplified plan view 100 of a vehicle 10 including various sensors, vision systems, controllers, communications systems, etc., one or more of which may be used with a vehicle control system. For example, the vehicle 10 may include long-range sensors (e.g., long-range radar) at the front of the vehicle 10 for use with adaptive cruise control applications 1. The vehicle 10 may also include lidar sensors at the front of the vehicle for use with emergency braking, pedestrian detection, and/or collision avoidance applications 2. In addition, a front vision system, such as a camera, provides images towards the front of the vehicle 10 for use with traffic sign recognition applications 3A and/or lane departure warning applications 3B. On the sides of the vehicle 10, a side view system, such as a camera, provides surround views 6aA, 6B for at least part of the side views. Similarly, a rear vision system, such as a camera, provides images towards the rear of the vehicle 10 for use with park assistance and/or surround view applications 9. For closer monitoring, the vehicle 10 may include short or medium-range sensors (e.g., radar) at the front for use with cross traffic alert applications 4 and at the rear for use with rear collision warning applications 8. In addition, the vehicle may include short or medium-range sensors on the sides for blind spot applications 7A, 7B. Finally, the vehicle may include short-range sensors, such as ultrasound sensors, at the front and back of the vehicle for use with park assist control 5A, 5B. Though not explicitly shown, it will be appreciated that any suitable type and connection of sensors can be used and connected with a GPS system and vehicle-to-infrastructure (V2X) communications system to provide communications between the vehicle 10 and other structures, such as other vehicles, road-side systems.

In the illustrated example of FIG. 1, most of the sensing happens in close proximity of the vehicle 10. Thus, there are distance limitations on the ability to detect objects. And if the vehicle 10 is moving at higher speeds, the only useful sensors are the long-range radar sensors. Another drawback with conventional sensor-based approaches is that each different sensor type provides a distinct, directional sensing capability that depends on the sensor technology and the resulting object-signal interaction. This can result in gaps or openings in the vehicle's sensing envelope that are created by the uses of different sensor types on different parts of the vehicle.

Figure 2:
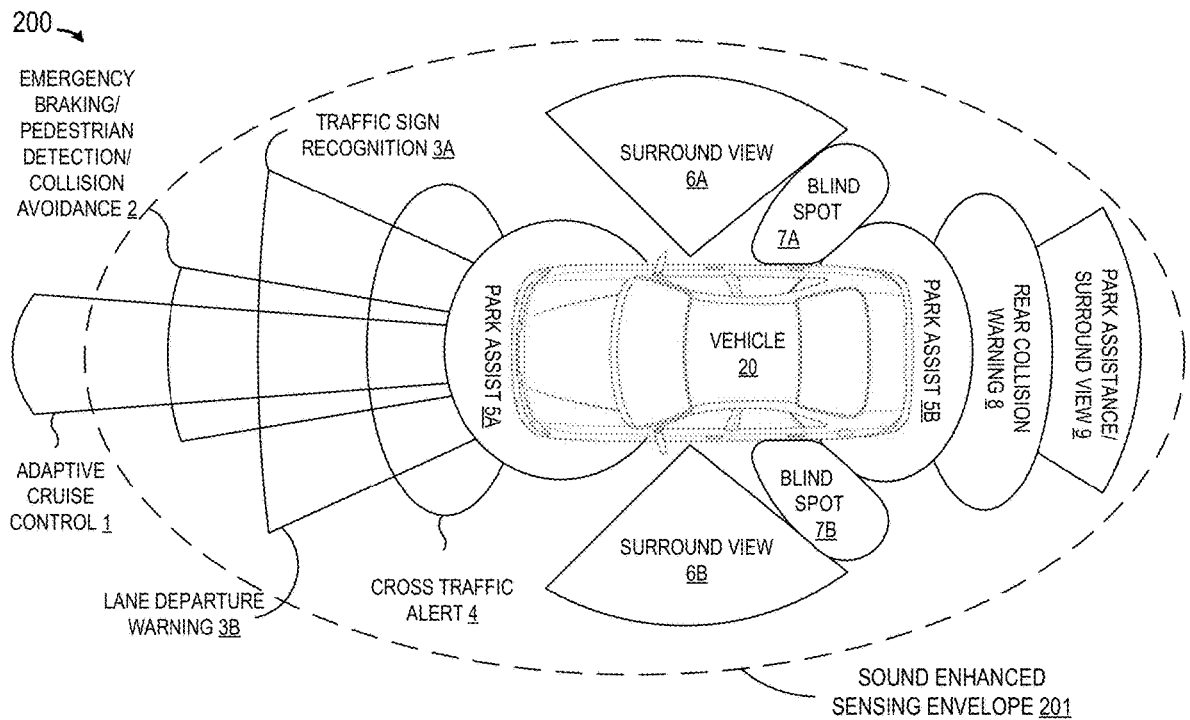
FIG. 2 depicts a simplified plan view of a vehicle which includes various sensors, vision systems, controllers, and communications systems in combination with one or more additional sound sensors which are deployed to generate a sound enhanced sensing envelope around the vehicle in accordance with selected embodiments of the present disclosure.

To provide additional details for an improved understanding of selected embodiments of the present disclosure, reference is now made to FIG. 2 which depicts a simplified plan view 200 of a vehicle 20 which includes various sensors, vision systems, controllers, and communications systems in combination with one or more additional sound sensors which are deployed to generate a sound enhanced sensing envelope 201 around the vehicle. Similar to the example of FIG. 1, the vehicle 20 may include long-range radar sensors for use with adaptive cruise control applications 1, as well as lidar sensors at the front of the vehicle for use with emergency braking, pedestrian detection, and/or collision avoidance applications 2. In addition, the vehicle 20 may include camera or vision sensors on all sides for use with traffic sign recognition applications 3A, lane departure warning applications 3B, surround views 6A, 6B, and/or park assistance and/or surround view applications 9. For closer monitoring, the vehicle 20 may include short or medium-range radar sensors for use with cross traffic alert applications 4, blind spot applications 7A, 7B, and/or rear collision warning applications 8. Finally, the vehicle may include ultrasound sensors for use with park assist control 5A, 5B. By also providing an additional class of long-range sensors to generate the multi-dimensional sensing map 201, the vehicle 20 has improved sensing capabilities by virtue of adding the ability to hear safety threats in the environment, and not just see them, thereby meeting the more stringent requirements for an autonomous driving system relating to the safety of the occupants and goods when moving at higher speeds.

The benefits of using additional sound sensors are multifold. First of all, sounds sensors are passive detectors that are relatively inexpensive in terms of hardware costs and associated computational processing requirements. In addition, sound sensors provide the ability to detect traffic participants that are producing sounds (e.g., rolling tire sounds, engine sounds, horn sounds, emergency sounds, braking sounds, etc.) that are simply not detected with conventional camera, ultrasound, lidar or radar sensors. This results from the fact that many conventional sensors (e.g., radar) use radio or electromagnetic waves which propagate through the air and reflect back to the sensor device, whereas sound sensors detect sound in the form of a mechanical disturbance from a state of equilibrium that propagates through an elastic material medium, such as air, as a longitudinal wave in which the mechanical vibration constituting the sound wave occurs along the direction of propagation of the wave. Due to the similarity between sound waves and radio waves, the signal theories for radio waves are largely applicable to sound waves since both can be represented as a sinusoidal curve. In the case of sound waves, the pressure variation in a sound wave repeats itself in space over a specific distance which is known as the wavelength of the sound (usually measured in meters). As the sound wave propagates through the air, one full wavelength takes a certain time period to pass a specific point in space (usually measured in microseconds). By determining the sound wave parameters, such as wavelength, period, attenuation, and interference, it is possible to compute or predict other parameters relating to the object generating the sound, such as distance to/from an object, the speed of the object relative to the observer, the direction of arrival, the type of object, etc.

Compared with other types of detectable sources (e.g., radar, camera or vision), sound sensors provide a passive and inexpensive sensing method that does not rely on expensive transmitting/emitting technologies in order to collect information about surroundings. Another advantage of sound sensors is that they can detect or "sense" an object that cannot be directly "seen," an ability that arises from the property of sound waves which can travel in all directions by propagation and reflection so that reflected/propagated sound can be heard around a physical barrier that blocks visual detection from being possible. For example, a sensor array of microphone elements can detect objects or situations that might be hidden/coming around a corner, such as a low visibility corner intersection or traffic merging lane from a residential area that is protected by a sound wall. In both scenarios, there is no direct field of view available, there preventing electromagnetic sensors (e.g., camera, lidar, radar) from "seeing" what is about to happen. In another example, a sensor array of microphone elements can detect objects or situations that are far away in front of the vehicle beyond the measurement capability of active sensors (e.g., camera, lidar, radar), but that can be detected with passive sound sensing, such as when there is a forward accident on the highway, followed by fast deceleration of the cars in front. Sound sensors can also detect dangerous situations on curvy roads far ahead that generate squealing tires as the speed car takes a corner too fast. Yet another example of sound sensor detection can arise when detecting objects or situations that happen behind the vehicle or in the blind spots not covered by other sensors, such as camera or radar sensors.

Referring back to FIG. 2, the simplified plan view 200 provides a two-dimensional indication of the range of coverage for the different types of sensors on the vehicle 20. In the example shown, the range of the radar sensors may be as designated by regions 1, 4, 7, and 8. In addition, the range of lidar sensors may be designated by region 2, and the range of camera sensors may be designated by regions 3, 6, and 9. Likewise, the range of the ultrasonic sensors may be as designated by the regions 5A, 5B. Further, the range for the sound sensor(s) may be as designated by the sound enhanced sensing envelope 201. Each of the different sensors deployed on and/or in the vehicle 20 has various coverage limits indicated by the identified regions 1-9, 201 which represent the coverage limits of the sensors in a horizontal plane. These sound sensors may also have limitations both in distance from the vehicle 20 and in the vertical plane. These coverage limits, in the horizontal plane, the vertical plane, and in distance from the vehicle 20, may define the three-dimensional coverage area or limits for each of the sensors.

In combination with the regions 1-9 for ADAS sensors (namely the lidar, radar, camera, and ultra-sound sensors), the sound enhanced sensing envelope 201 generated by the sound sensor(s) provides numerous advantages that can be used to augment the ADAS sensor solutions. For example, sound sensors may be used during active driving to compensate, enhance, and/or augment sensor performance where any of the ADAS sensors fail due to sensor device failure, lack of visibility around a corner or physical barrier, bad weather conditions (e.g., snow or heavy rain), or sensor-specific technology problems (e.g., radar problems with signal jamming, insufficient target size, object clutter, etc.).

In addition to compensating or adjusting for ADAS sensor failures, sound sensors can be used for passively checking for safe or free space in the sound enhanced sensing envelope 201. For example, sound sensors may be used as a double checker to verify if there is a free space for a maneuver or trajectory change. In addition or in the alternative, sound sensors may be used as backup governor for attaining high level of ASIL compliance in case the other sensors fail.

In addition, there are other technology and cost benefits. As mentioned previously, sound sensors are less expensive since they may be implemented with a passive listener or microphone circuit. Sound sensor data processing is also relatively straightforward and requires less computational resources than the data processing required for ADAS sensors, such as radar and image data. There are also no regulatory requirements for sensing sounds, in contrast to other electromagnetic sensors, such as radar, which are highly regulated. Sound sensors also provide good accuracy for long range detection, especially in wide-open traffic environments that often exist for vehicles. For example, if a noise source emits an audio signal power of x watts, then the maximum distance d at which a sound sensor will be able to detect is $$d = \sqrt{\frac{X}{4\pi I_0}},$$

where $I_0$ is the lowest audible intensity or threshold of about $10^{-12}$ W/m². For example, if an accelerating motorcycle produces a sound power of 0.1 W, then a sound sensor can detect the motorcycle from about 89 Km. Of course, sound sources are not necessarily isotropic or even stationary, and the intensity of a sound wave dampens as it travels over distance, and is also changed by solid objects (e.g., trees, walls, etc.) that absorb and reflect sound.

Figure 3:
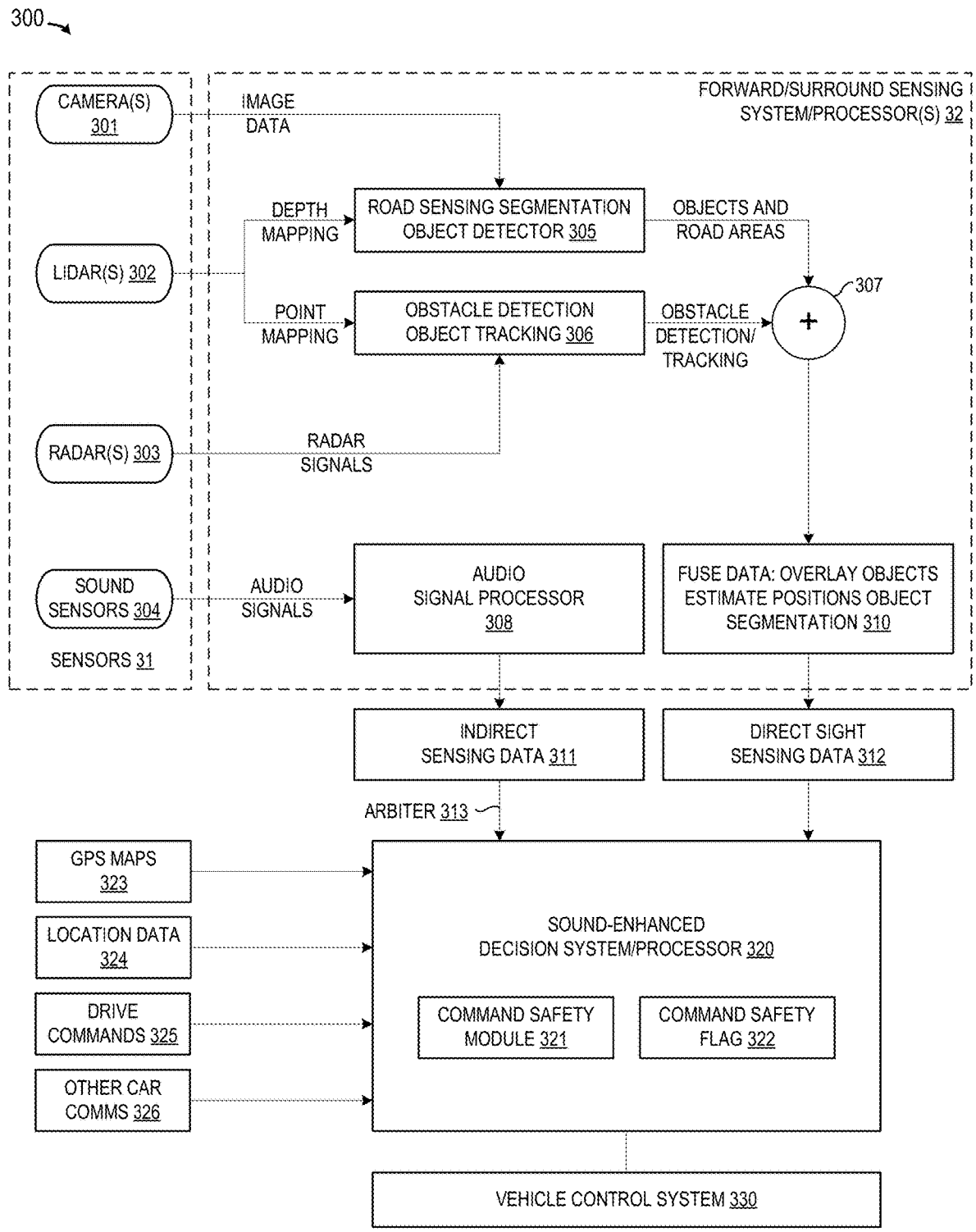
FIG. 3 depicts a simplified block diagram depiction of an architecture with enhanced sound sensors which are connected to generate a sound enhanced sensing envelope on an automotive vehicle in accordance with selected embodiments of the present disclosure.

To provide additional details for an improved understanding of selected embodiments of the present disclosure, reference is now made to FIG. 3 which depicts a simplified block diagram of an architecture 300 which uses sound sensors 304 in combination with other sensors 301-303 to generate a sound enhanced sensing envelope around an automotive vehicle. At a general level, the architecture 300 includes a plurality of sensors 31 which are connected to a forward or surround sensing system or processor(s) 32 to generate "direct" sight sensing data 312 (from the ADAS sensors 301-303) and "indirect" sensing data 311 (from the sound sensors 304). In turn, the direct and indirect sensing data 311, 312, is processed by the sound-enhanced decision system or processor(s) 320 to evaluate commands provided to the vehicle control system 330. In particular, the sound-enhanced decision system or processor(s) 320 may evaluate the direct and indirect sensing data 311, 312 by using a command safety module 321 to set or reset a command safety flag 322 based on one or more processing inputs 323-326 and the direct and indirect sensing data 311, 312. Based on the evaluation results, the decision processor 320 issues commands or instructions to the vehicle control system 330 which may be implemented with one or more electronic control units (ECUs), such as a gateway ECU, automatic braking system ECU, electronic power steering ECU, engine ECU, instrumentation ECU, or the like.

In selected embodiments, the sensors may include a plurality of ADAS sensors 31 which include one or more augmenting sound sensors 304. For example, the ADAS sensors 31 may include one or more camera sensors 301 positioned around the vehicle. As will be appreciated, camera sensors can actually "see" the surrounding environment, and may be used to detect and classify objects, recognize texture, detect traffic signs, and the like. Using the camera sensor(s), a 3D map of the area surrounding the vehicle can be constructed. The ADAS sensors 31 may also include one more active sensors, such as lidar sensors 302 or radar sensors 303, positioned around the vehicle. Each radar sensor 303 may be part of a detection system that uses radio waves to determine the range, angle, or velocity of objects in the vicinity of the vehicle. While radar sensors are generally very robust in detecting objects within a good range of the vehicle in all weather and lighting conditions, they do have some limitations in terms of the angular and range resolution compared to camera sensors. In similar fashion, the lidar sensor(s) 302 may be included as part of a detection system that measures distance to a target by illuminating the target with pulsed laser light and measuring the reflected pulses with the lidar sensor. While lidar sensors 302 effectively combines the benefits of camera and radar sensors in capturing an effective 3D map of the areas surrounding a vehicle with superior resolution, they are very expensive in terms of costs and computational processing resources. Another type of active sensor is an ultrasound sensor (not shown) that measures the distance to nearby objects by sending out a sound pulse with high frequency then pick up the reflected waves. Such ultrasound sensors can warn the driver of surrounding obstacles in close proximity to the vehicle. Of course, any suitable sensor can be included in the plurality of sensors 31, such as an image sensor, infrared sensor, or the like.

As illustrated, the sensors 31 are connected to provide input data to the forward/surround sensing system 32 which may be embodied as one or more processors. For example, with automotive applications providing advanced driver-assistance system (ADAS) capabilities that are compliant with specified Automotive Safety Integrity Level (ASIL)

risk classification schemes (e.g., ASIL levels A-D, where A is the lowest safety requirement and D is the highest safety requirement), the forward/surround sensing system 32 may be implemented to perform risk analysis for complex scenarios (e.g., automated driving, driver assistance, pedestrian avoidance, etc.) with a first forward sensing processor (for implementing a drive processing channel or path) and a second surround sensing processor (for implementing a safety processing channel or path). In this arrangement, the first forward sensing processor may perform drive channel/path processing of intensive and complex computations based on input data from the camera(s) 301, lidar(s) 302, and radar(s) 303 using very complex algorithms, high data bandwidth, and significant computational resources. In contrast, the second surround sensing processor may perform safety channel/path processing based on input data from the sound sensor(s) 304 to provide a backup or alternative calculation to check if the computed results from the forward sensing processor are valid or not. Typically, such an "alternative" computation should be computed in a system that is completely separated by the main decision factor to prevent the alternative computations from being influenced by the same factors that might corrupt the data or processes in the first computations (e.g., a power glitch or a mechanical vibration). In this arrangement, the second surround sensing processor is the "low cost" partner or arbiter that will use a different approach to come up with a solution for the same problem as the first forward sensing processor, but using other types of input data (e.g., sound sensor input data) that is independent of the first forward sensing processor hardware and input sensors. However, it will be appreciated that the forward/surround sensing system 32 may be implemented with a single processor, alone or in combination with additional processing hardware to process the input sensor data from the sensors 31.

In the example shown in FIG. 3, each camera sensor 301 may be connected to provide image data to a road sensing segmentation and object detector module 305 which is also connected to receive depth mapping data from one or more lidar sensors 302. Using any suitable image processing techniques, the road sensing segmentation and object detector module 305 is configured to generate output data which identifies objects and road areas from the input depth mapping and image data. In addition, each radar sensor 303 may be connected to provide radar signal data to an obstacle detection and object tracking module 306 which is also connected to receive point mapping data from one or more lidar sensors 302. Using any suitable signal processing techniques, the obstacle detection and object tracking module 306 is configured to generate output data which identifies and tracks detected obstacles from the input point mapping and radar signals. At the fusion module 307, the outputs from the road sensing segmentation and object detector module 305 and the obstacle detection and object tracking module 306 are combined using any suitable signal combination techniques. The resulting fuse data 310 that is output from the fusion module 307 includes overlay objects along with estimated positions and object segmentation data, thereby providing direct sight sensing data 312 that is computed from the "direct sight" sensors, such as the camera(s) 301, lidar(s) 302, and radar(s) 303.

To provide "low cost" arbiter data 313 using different computational approach than used to generate the direct sight sensing data 312, one or more sound sensors 304 may be connected to provide audio signal data to an audio signal processor 308 which is not connected to receive input data from the other sensors 301-303. In selected embodiments, the sound sensors 304 may be embodied as an array of microphone sensors that is positioned to detect audio signals from the front, sides, and back of the vehicle. For example, one or more sound sensors or passive microphones which are mounted close to the roof of the car and/or directly on the inside part of the car glass surface to help to detect the sounds in the surroundings for building a sound map with potential threats. At the audio signal processor 308, the detected audio signals are processed using any suitable audio signal processing technique to generate output data which identifies the presence or absence of potential threats or obstacles based on information captured from the sound sensors 304. In selected embodiments, the audio signal processor 308 may be implemented as a separate surround sensing processor which processes the audio signal data detected by the "indirect" sound sensors 304, thereby providing indirect sensing data 311.

As illustrated, the forward/surround sensing system 32 is connected to provide the direct and indirect sensing data 311, 312 to the sound-enhanced decision system/processor 320 which may be embodied as one or more processors. As illustrated, the sound-enhanced decision system/processor 320 is also connected to receive input data from a 3D GPS map 323 and location data 324 that are stored in memory. In addition, the sound-enhanced decision system/processor 320 is connected to receive commands for processing, such as drive commands 325 and other vehicle commands 326. In selected automotive applications for providing advanced driver-assistance system (ADAS) capabilities, the sound-enhanced decision system/processor 320 may be implemented to make decisions for complex scenarios (e.g., automated driving, driver assistance, pedestrian avoidance, etc.) with one or more controllers for collecting the direct and indirect sensing data 311, 312 for analysis so that the indirect sensing data 311 (based on sound sensor data) provides secondary data that be used as a "digital twin" or arbiter signal 313 for augmenting or verifying the direct sight sensing data 310 that is generated from the "direct" sensors 301-303. For example, after sound signal processing and all the other sensors computations, the audio signal processor 308 can issue indirect sensing data 311 that conveys a "clear zone" message to the sound-enhanced decision system/processor 320 if no threads/obstacles are detected or heard. At the decision processor 320, the command safety module 321 may be configured to process the direct sight sensing data 312 that is generated from the camera(s) 301, lidar(s) 302, or radar(s) 303 based on the assumption that these sensors are the primary sensing technology, but to also process the indirect sensing data 311 conveying a "clear zone" message to confirm the accuracy of the direct sight sensing data 310. However, if there is any specific use-case failure of any direct sensor data, the indirect sensing data 311 can be processed at the decision processor 320 to detect such failures.

To provide an example of such a use-case failure, the audio signal data from the sound sensor(s) 304 may indicate that a sound "threat" is detected. In response, the audio signal processor 308 can issue indirect sensing data 311 that conveys a "warning" of a detected potential threat, even if the exact location or source cannot be recognized. At the decision processor 320, the command safety module 321 may be configured to process the direct sight sensing data 312 in combination with the indirect sensing data 311 to set a command safety flag 322 which conveys a "warning" message to prevent a collision, detect a moving object, or otherwise improve the operational safety of the vehicle. In another example use-case failure, the audio signal processor 308 can issue indirect sensing data 311 that conveys a "hold off" signal to the decision processor 320 if the sound sensor(s) 304 detect a potential threat that can be materialize in the proximity of the vehicle. In response, the command safety module 321 may be configured to process the direct sight sensing data 312 in combination with the indirect sensing data 311 to set a command safety flag 322 which conveys a "hold" message to prevent an automated maneuver until the threat is confirmed, dismissed, or otherwise addressed. As will be appreciated, the indirect sensing data 311 provided to the decision system/processor 320 may have assigned priorities, depending on the scenario and/or predetermined factors.

To implement the depicted functionality for using sound sensors to augment a sensing envelope around the vehicle which is used to identify safety-related events, the forward/surround sensing system 32 and/or sound-enhanced decision system 320 may include any suitable processing device, such as a processor, CPU, microprocessor, a microcontroller, or the like, that may be programmed with software instructions and/or programming code. In addition, the processing device may be embodied with one or more processors, each having one or more processor cores included therein. In addition, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. In addition or in the alternative, the processing device may be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

A memory connected to the processing device over a memory bus may store programming code and/or software instructions for execution by the processing device to augment the sensing envelope around the vehicle which is used to identify safety-related events. The memory may include one or more volatile storage (or memory) devices such as random access memory (RAM), dynamic RAM (DRAM), synchronous DRAM (SDRAM), static RAM (SRAM), or other types of storage devices. In addition or in the alternative, the memory may include non-volatile memory, such as read only memory (ROM), electrically erasable programmable ROM, flash memory, or the like. In whatever form, the memory may store information including sequences of instructions that are executed by the processing device or any other device. For example, executable code and/or data, in including but not limited to an operating system, device drivers, firmware (e.g., input output basic system or BIOS), and/or applications can be loaded in the memory and executed by the processing device.

Figure 4:
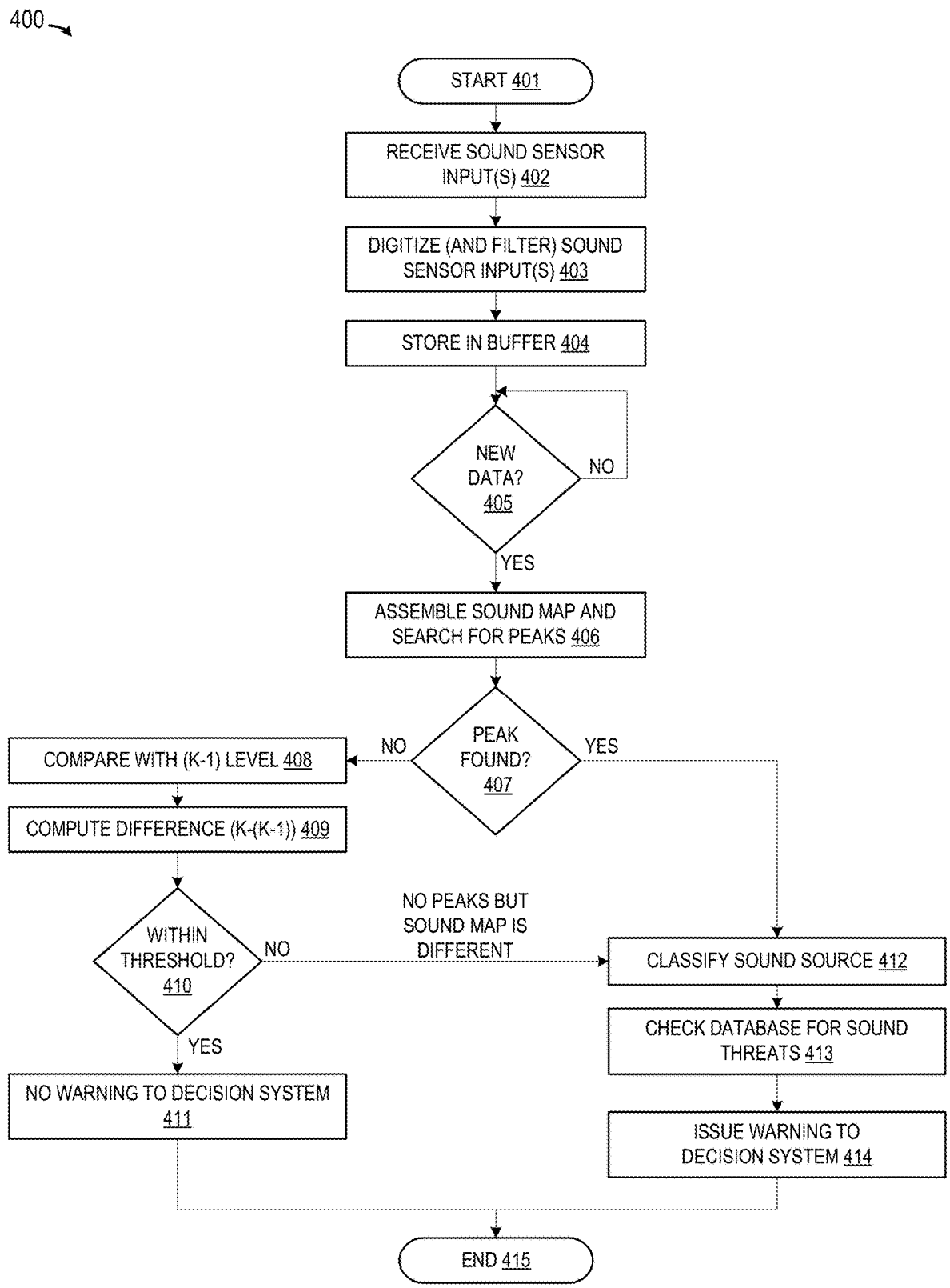
FIG. 4 depicts a simplified flow chart showing the logic for processing audio signals received from sound sensors in surround and decision processing domains to generate warning signals in accordance with selected embodiments of the present disclosure.

To provide additional details for an improved understanding of selected embodiments of the present disclosure, reference is now made to FIG. 4 which depicts a simplified flow chart 400 showing the logic for processing audio signals received from sound sensors in surround and decision processing domains of a vehicle driving system to generate warning signals. In an example embodiment, the control logic and methodology shown in FIG. 4 may be implemented as hardware and/or software on an electronic control unit (ECU), microcontroller unit, or audio signal processor (e.g., 308) that includes processor and memory for storing programming control code for controlling the operation of autonomous vehicles using advanced driver assistance systems.

An embodiment of a method 400 for augmenting an ADAS sensor envelope with data collection from one or more sounds sensors in real time for a vehicle (e.g., 200) may include steps 401-415 shown in the general order of FIG. 4, though the method may include more or fewer steps or can arrange the order of the steps differently than those shown. Generally, the method 400 starts with a start operation 401 and ends with step 415 after processing at either of the operational steps 411, 414, depending on whether a sound sensor signals the possibility of a threat or obstacle near the vehicle. As disclosed herein, the method 400 can be executed as a set of computer-executable instructions executed by a computer system or processor and encoded or stored on a computer readable medium. In other configurations, the method 400 may be executed by a series of components, circuits, and gates created in a hardware device, such as a System of Chip (SOC), Application Specific Integrated Circuit (ASIC), and/or a Field Programmable Gate Array (FPGA).

Once the vehicle drive system starts and is operational, the ADAS sensors are activated, including one or more sound sensors which are operable to received sound sensor inputs at step 402. As illustrated in FIG. 3, the sound sensor data signals may be provided from driver vehicle sensors 304 to the audio signal processor 308. In selected embodiments, the sound sensor input(s) may be captured by a sound sensor array that includes microphone sensing elements positioned around the vehicle to detect sounds from the front, sides and back of the vehicle. At step 403, the sound sensor input(s) may be digitized using any suitable analog-to-digital converter, thereby generating digitized sound sensor input signals. At step 403, the digitized sound sensor input signals may optionally be filtered by applying a suitable digital filter to remove spurious signals, though the filtering step may not be required in every embodiment. At step 404, the digitized sound sensor input signals may then be stored in memory, such as an SRAM buffer, if necessary for subsequent retrieval and processing. At step 405, the method pauses if there is no new data (negative outcome to detection step 405), but then proceeds upon detecting new sound sensor data (affirmative outcome to detection step 405). In selected embodiments, the processing steps 402-405 may be performed in whole or in part by an audio signal processor (e.g., 308) which processes the received audio signals from the sound sensor 304.

Once "new" sound sensor data is detected, a sound map is assembled from the sound sensor input data and then processed to find peaks in the map at step 406. In selected embodiments, the processing at step 406 may be performed by an audio signal processor which is connected to receive (or retrieve from memory) sound sensor data signals which are generated by other traffic participants. The sound sensor data signals may be provided from the driver vehicle sensor(s) 304 to the audio signal processor 308 as separate signals which are processed to assemble the sound map around the vehicle to augment the sensing envelope around the car by identifying potential threats from the other traffic participants generating audible sound that is not detected by the "direct" sensors.

At step 407, the sound map is analyzed to identify any peaks or other audio signal characteristics which may signal the presence of an obstacle or threat. A detected "peak" (affirmative outcome to detection step 407), indicates that some type of threat or obstacle has been detected from the sound sensors, in which case additional processing steps 412-424 are performed. However, the absence of any detected peak (negative outcome to detection step 404) indicates that additional processing steps 408-410 should be applied to evaluate the new sound sensor input.

In the event that a peak in the sound map is found (affirmative outcome to detection step 407), the audio signal and/or sound map is processed to classify the sound source at step 412. While any suitable classification technique may be used, the audio signal processor may employ any suitable convolutional neural network (CNN) processing, artificial intelligence, and/or machine learning processing to classify the sound source as a threat, obstacle, object, or the like. At step 413, a database is searched to identify any sound threats which correspond to the classified sound source. Based on the results of the database search, a warning or error message is issued to the decision system or processor at step 414. Generated in real time from the sound sensor data results can with inexpensive processing techniques, the warnings issued at step 414 can be used by the decision system to build a safety net around the vehicle to augment the decisions generated from the primary sensor data during emergency actions (e.g., using the sound sensor data to identify an immediate threat during a vehicle operation, such as an unseen motorcycle accelerating from behind the vehicle) and/or check actions (e.g., using the sound sensor data to notify the autonomous driving system of an unidentified threat). In addition or in the alternative, the sound sensor data results can be used as a "digital twin" or "arbiter" when verifying or confirming autonomous driving maneuvers generated in response to the primary sensor data analysis and/or to enhance the safety of the autonomous driving system by feeding in new type of data which cannot be captured with the primary sensors. In selected embodiments, the processing steps 412-414 may be performed in whole or in part by an audio signal processor (e.g., 308) which processes the received audio signals from the sound sensor 304 before proceeding to step 415 where the process ends.

In the event that there is no peak found in the sound map (negative outcome to detection step 407), the newly assembled sound map (from step 406) is compared with the previously generated (K−1) sound map at step 408. While any suitable comparison technique may be used, the audio signal processor may compare the current or "new" K level sound map with the previous (K−1) level sound map at step 408 by computing a difference value between the K level and (K−1) level maps (step 409) for comparison against a minimum difference threshold (step 410). If the computed difference is within the minimum difference threshold (affirmative outcome to detection step 410), this indicates that the new sound map is not sufficiently different to require any correction or warning, in which case there is no warning issued to the decision system (step 411) or an equivalent "no warning" message is provided to the decision system. However, if the computed difference is not within the minimum difference threshold (negative outcome to detection step 410), this indicates that the new sound map is sufficiently different to require any correction or warning, in which case the method proceeds to steps 412-414 to classify and issues a warning or error message. In selected embodiments, the processing steps 408-411 may be performed in whole or in part by an audio signal processor (e.g., 308) which processes the received audio signals from the sound sensor 304 before proceeding to step 415 where the process ends.

As disclosed herein, a sound-enhanced advanced driver-assistance system (ADAS) and method of operating same are provided to assist with vehicle operation by enhancing the safety and security of autonomous systems. With the disclosed system, the sound-enhanced decision system can make safe maneuvers on highways by using the sound sensors to check lane changing for motorcycles or fast-moving vehicles coming from behind and to detect public utility vehicles (e.g., ambulance, firefighting trucks, police cars) that are approaching the vehicle. The sound-enhanced decision system may also prevent collisions by using the sound sensors to generate alerts based detected forward fast deceleration and/or hard breaking of other traffic participants. In addition, the sound-enhanced decision system can use the sound sensors to detect dangerous operations by the vehicle or surrounding traffic participants that are navigating dangerous (e.g., curvy or steep) roads or tight turns or corners in the roads. The sound-enhanced decision system may also use the sound sensors to detect residential areas and/or children (e.g., around kindergartens, schools, parks, parked cars) where the vehicle should be safely navigating, as well as to improve safety near pedestrian crossings. In addition to using the sound sensor data to issue warnings to augment the operational safety of the decision systems, the sound sensors can be used to securely identify the owner or passenger (in case the car is used as autonomous taxi) through voice interactions. In addition, the sound sensors can be used to detect quick voice commands to control a vehicle, such as by detecting an authorized or authenticate voice command (e.g., from police personnel) to move a car forward, clear area, etc.

By now it should be appreciated that there has been provided a computer-implemented method, architecture, circuit, and system for generating a sound-enhanced sensing envelope. In the disclosed methodology, a plurality of sensors and one or more passive sound sensors of a vehicle collect sensor data signals characterizing an exterior environment of the vehicle. In selected embodiments, the sensor data signals are collected by passively capturing sound waves generated by other traffic participants using a microphone array affixed to the vehicle. In other embodiments, the sensor data signals are captured with direct sensors selected from a group consisting of a camera, lidar detector, and radar detector. In other embodiments, the sensor data signals are captured with sensors selected from a group consisting of a camera, lidar detector, radar detector, and an ultrasound detector. From the collected sensor data signals, one or more direct sensor data signals collected from the plurality of sensors are processed to generate a sensing envelope around the vehicle using direct sensing data signals. In addition, one or more indirect sensor data signals which are collected from the one or more passive sound sensors are processed to generate a sound-enhanced sensing envelope around the vehicle using indirect sensor data signals. In selected embodiments, a first processor processes the one or more direct sensor data signals to generate the sensing envelope, and a second processor processes the one or more indirect sensor data signals to generate the sound-enhanced sensing envelope. Using the sound-enhanced sensing envelope, advanced driver assistance system commands for the vehicle are evaluated with respect to safety-related events identified by the indirect sensor data signals. In selected embodiments, the sound-enhanced sensing envelope is used to evaluate a defensive maneuver command for the vehicle with respect to safety-related events identified by the indirect sensor data signals. In other embodiments, the sound-enhanced sensing envelope is used to evaluate a free-space checking command for the vehicle with respect to safety-related events identified by the indirect sensor data signals.

In another form, there is provided an advanced driver assistance system which includes a plurality of sensors configured to collect first sensor data signals from respective portions of an environment of a vehicle. In selected embodiments, the plurality of sensors are embodied as one or more direct sensors selected from a group consisting of a camera, lidar detector, radar detector, and an ultrasound detector. The disclosed system also includes one or more passive sound sensors configured to collect second sensor data signals characterizing an exterior environment of the vehicle. In selected embodiments, the passive sound sensors are embodied as a microphone array affixed to the vehicle for capturing sound waves generated by other traffic participants. In addition, the disclosed system includes one or more processors and data storage storing instructions that, when executed by the one or more processors, cause the system to perform operations which include processing the first sensor data signals which are collected from the plurality of sensors to generate a sensing envelope around the vehicle. The executed instructions also cause the system to process the second sensor data signals which are collected from the one or more passive sound sensors to generate a sound-enhanced sensing envelope around the vehicle. In addition, the executed instructions cause the system to use the sound-enhanced sensing envelope to evaluate advanced driver assistance system commands for the vehicle with respect to safety-related events identified by the second sensor data signals. In the disclosed methodology, a plurality of sensors and one or more passive sound sensors of a vehicle collect sensor data signals characterizing an exterior environment of the vehicle. In selected embodiments, a first processor processes the first sensor data signals to generate the sensing envelope, and where a second processor processes the second sensor data signals to generate the sound-enhanced sensing envelope. In selected embodiments, the sound-enhanced sensing envelope is used to evaluate a defensive maneuver command for the vehicle with respect to safety-related events identified by the second sensor data signals. In other embodiments, the sound-enhanced sensing envelope is used to evaluate a free-space checking command for the vehicle with respect to safety-related events identified by the second sensor data signals.

In another form, there is provided an apparatus for operating an advanced driver assistance system (ADAS) on a vehicle which include a first plurality sensors and a second plurality of sound sensors that are arrayed around the vehicle to collect sensor data signals characterizing an exterior environment of the vehicle. As disclosed, the apparatus includes one or more electronic control units (ECUs) connected to receive a first set of primary sensor data signals from the first plurality sensors which characterize a surrounding environment of the vehicle and to receive a second set of augmenting sensor data signals from the second plurality of sensors which characterize a surrounding audio environment of the vehicle. In this configuration the ECU(s) are configured to generate sound-enhanced advanced driver assistance system commands by using the second set of augmenting sensor data signals to augment a sensing envelope around the vehicle which is computed from the first set of primary sensor data signals and used to identify safety-related events in proximity to the vehicle. For example, the one or more ECUs may include a first processor which processes the first set of primary sensor data signals to generate the sensing envelope, and may include a second processor which processes the second set of augmenting sensor data signals to generate a sound-enhanced sensing envelope. In selected embodiments, the apparatus operates in a multi-modal sensor network that combines the second plurality of sound sensors with the first plurality of sound sensors comprising a plurality of orthogonal and complementary sensors. In selected embodiments, the ECU(s) are configured to generate sound-enhanced advanced driver assistance system commands by generating advanced driver assistance system commands from the first set of primary sensor data signals, computing a sound-enhanced sensing envelope around the vehicle from the second set of augmenting sensor data signals, and using the sound-enhanced sensing envelope to evaluate the advanced driver assistance system commands for the vehicle with respect to safety-related events identified by the sound-enhanced sensing envelope. In other embodiments, the ECU(s) are configured to detect, classify, and provide notification of hazardous road conditions by passively capturing sound signal from the driving environment using the second plurality of sound sensors to augment the sensing envelope around the vehicle which is used to identify safety-related events. In other embodiments, the ECU(s) are configured to use the second set of augmenting sensor data signals to improve vehicle sensing capabilities by creating a multi-dimensional sensing map around the vehicle which augments the sensing envelope around the vehicle. In selected embodiments, the ECU(s) may be configured to generate the sound-enhanced advanced driver assistance system commands by using the sound-enhanced sensing envelope to evaluate a defensive maneuver command or a free-space checking command for the vehicle with respect to safety-related events identified by the second set of augmenting sensor data signals.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described hereinabove with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In certain implementations, a system on a chip or SOC may be implemented.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the described exemplary embodiments disclosed herein focus on example autonomous driver systems, devices, and methods for using sound sensors in combination with multiple orthogonal and complementary sensors to passively capture sound signal from the driving environment to augment a sensing envelope around the vehicle which is used to identify safety-related events, the present invention is not necessarily limited to the example embodiments illustrate herein. For example, various embodiments of using sound sensors may be applied in any suitable autonomous systems, and not just autonomous driver systems, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for generating a sound-enhanced sensing envelope, comprising:
   collecting, by a plurality of sensors and one or more passive sound sensors of a vehicle, sensor data signals characterizing an exterior environment of the vehicle;
   processing one or more direct sensor data signals which are collected from the plurality of sensors to generate a sensing envelope around the vehicle using direct sensing data signals;
   processing one or more indirect sensor data signals which are collected from the one or more passive sound sensors to generate, based on the sensing envelope, a sound-enhanced sensing envelope around the vehicle using indirect sensor data signals, wherein processing the one or more indirect sensor data signals comprises:
      identifying whether a peak is present in a sound map assembled from the one or more indirect sensor data signals;
      in response to identifying a peak is not present, comparing the sound map assembled from the one or more indirect sensor data signals to a sound map assembled from one or more prior indirect sensor data signals;
      determining, based on the comparison, whether a difference criterion is satisfied;
      in response to the difference criterion being satisfied or in response to identifying a peak is present, classifying at least one sound source corresponding to the sound map assembled from the one or more indirect sensor data signals; and generating the sound-enhanced sensing envelope based on the sensing envelope and the at least one sound source; and using the sound-enhanced sensing envelope to evaluate advanced driver assistance system commands for the vehicle with respect to safety-related events identified by the indirect sensor data signals.

2. The computer-implemented method of claim 1, where collecting sensor data signals comprises passively capturing sound waves generated by other traffic participants using a microphone array affixed to the vehicle.

3. The computer-implemented method of claim 1, where collecting sensor data signals comprises capturing sensor data signals with direct sensors selected from a group consisting of a camera, lidar detector, and radar detector.

4. The computer-implemented method of claim 1, where collecting sensor data signals comprises capturing sensor data signals with sensors selected from a group consisting of a camera, lidar detector, radar detector, and an ultrasound detector.

5. The computer-implemented method of claim 1, where a first processor processes the one or more direct sensor data signals to generate the sensing envelope, and where a second processor processes the one or more indirect sensor data signals to generate the sound-enhanced sensing envelope.

6. The computer-implemented method of claim 1, where the sound-enhanced sensing envelope is used to evaluate a defensive maneuver command for the vehicle with respect to the safety-related events identified by the indirect sensor data signals.

7. The computer-implemented method of claim 1, where the sound-enhanced sensing envelope is used to evaluate a free-space checking command for the vehicle with respect to safety-related events identified by the indirect sensor data signals.

8. A system comprising:

a plurality of sensors configured to collect first sensor data signals from respective portions of an environment of a vehicle;

one or more passive sound sensors configured to collect second sensor data signals characterizing an exterior environment of the vehicle;

one or more processors and data storage storing instructions that, when executed by the one or more processors, cause the system to perform operations comprising:

processing the first sensor data signals which are collected from the plurality of sensors to generate a sensing envelope around the vehicle;

processing the second sensor data signals which are collected from the one or more passive sound sensors to generate, based on the sensing envelope, a sound-enhanced sensing envelope around the vehicle, wherein processing the second sensor data signals comprises:

identifying whether a peak is present in a sound map assembled from the second sensor data signals;

in response to identifying a peak is not present, comparing the sound map assembled from the second sensor data signals to a sound map assembled from one or more prior second sensor data signals;

determining, based on the comparison, whether a difference criterion is satisfied;

in response to the difference criterion being satisfied or in response to identifying a peak is present, classifying at least one sound source corresponding to the sound map assembled from the second sensor data signals; and generating the sound-enhanced sensing envelope based on the sensing envelope and the at least one sound source; and using the sound-enhanced sensing envelope to evaluate advanced driver assistance system commands for the vehicle with respect to safety-related events identified by the second sensor data signals.

9. The system of claim 8, where the one or more passive sound sensors comprise a microphone array affixed to the vehicle for capturing sound waves generated by other traffic participants.

10. The system of claim 8, where the plurality of sensors comprises one or more direct sensors selected from a group consisting of a camera, lidar detector, radar detector, and an ultrasound detector.

11. The system of claim 8, where a first processor processes the first sensor data signals to generate the sensing envelope, and where a second processor processes the second sensor data signals to generate the sound-enhanced sensing envelope.

12. The system of claim 8, where the sound-enhanced sensing envelope is used to evaluate a defensive maneuver command for the vehicle with respect to the safety-related events identified by the second sensor data signals.

13. The system of claim 8, where the sound-enhanced sensing envelope is used to evaluate a free-space checking command for the vehicle with respect to safety-related events identified by the second sensor data signals.

14. An apparatus for operating an advanced driver assistance system (ADAS) on a vehicle comprising a first plurality of sensors and a second plurality of sound sensors that are arrayed around the vehicle to collect sensor data signals characterizing an exterior environment of the vehicle, the apparatus comprising:

one or more electronic control units (ECUs) connected to receive a first set of primary sensor data signals from the first plurality sensors which characterize a surrounding environment of the vehicle and to receive a second set of augmenting sensor data signals from the second plurality of sound sensors which characterize a surrounding audio environment of the vehicle, where the one or more ECUs are configured to generate sound-enhanced advanced driver assistance system commands by using the second set of augmenting sensor data signals to augment a sensing envelope around the vehicle which is computed from the first set of primary sensor data signals and used to identify safety-related events in proximity to the vehicle, wherein the one or more ECUs are configured to augment the sensing envelope by being configured to:

identify whether a peak is present in a sound map assembled from the second set of augmenting sensor data signals;

in response to identifying a peak is not present, comparing the sound map assembled from the second set of augmenting sensor data signals to a sound map assembled from one or more prior second sets of augmenting sensor data signals;

determining, based on the comparison, whether a difference criterion is satisfied;

in response to the difference criterion being satisfied or in response to identifying a peak is present, classifying at least one sound source corresponding to the sound map assembled from the second set of augmenting sensor data signals; and augmenting the sensing envelope based on the at least one sound source.

15. The apparatus of claim 14, where the one or more ECUs are configured to generate sound-enhanced advanced driver assistance system commands by:

generating advanced driver assistance system commands from the first set of primary sensor data signals;

computing a sound-enhanced sensing envelope around the vehicle from the second set of augmenting sensor data signals; and using the sound-enhanced sensing envelope to evaluate the advanced driver assistance system commands for the vehicle with respect to safety-related events identified by the sound-enhanced sensing envelope.

16. The apparatus of claim 14, wherein the apparatus operates in a multi-modal sensor network that combines the second plurality of sound sensors with the first plurality of sensors comprising a plurality of orthogonal and complementary sensors.

17. The apparatus of claim 14, wherein the one or more ECUs are configured to detect, classify, and provide notification of hazardous road conditions by passively capturing sound signal from the driving environment using the second plurality of sound sensors to augment the sensing envelope around the vehicle which is used to identify safety-related events.

18. The apparatus of claim 14, wherein the one or more ECUs are configured to use the second set of augmenting sensor data signals to improve vehicle sensing capabilities by creating a multi-dimensional sensing map around the vehicle which augments the sensing envelope around the vehicle.

19. The apparatus of claim 14, where a first processor processes the first set of primary sensor data signals to generate the sensing envelope, and where a second processor processes the second set of augmenting sensor data signals to generate a sound-enhanced sensing envelope.

20. The apparatus of claim 19, wherein the one or more ECUs are configured to generate the sound-enhanced advanced driver assistance system commands by using the sound-enhanced sensing envelope to evaluate a defensive maneuver command or a free-space checking command for the vehicle with respect to the safety-related events identified by the second set of augmenting sensor data signals.

* * * * *